Jan. 25, 1938.  J. J. RING ET AL  2,106,684
GOVERNOR
Filed Aug. 31, 1935   3 Sheets-Sheet 1

Inventors
J. J. Ring
B. R. Nichols
A. Pfau
by
Attorney

Jan. 25, 1938.  J. J. RING ET AL  2,106,684
GOVERNOR
Filed Aug. 31, 1935  3 Sheets-Sheet 2
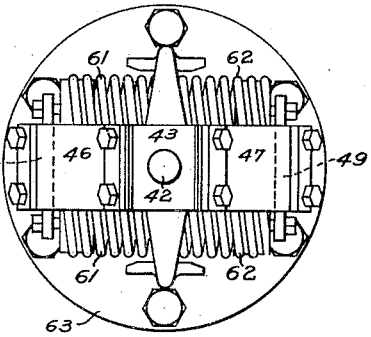
Fig. 3
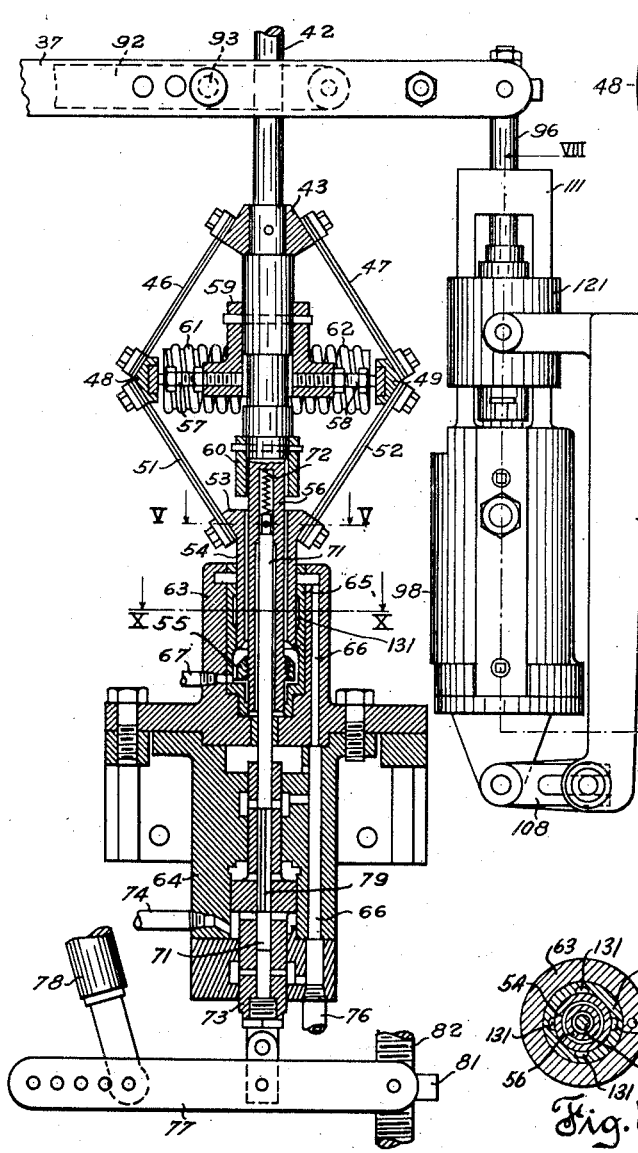
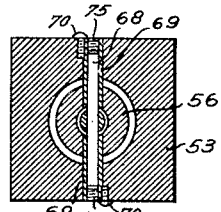
Fig. 5
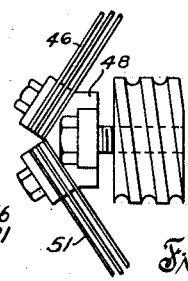
Fig. 10
Fig. 2
Fig. 4

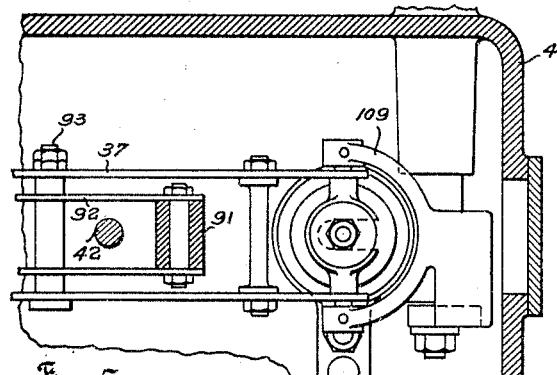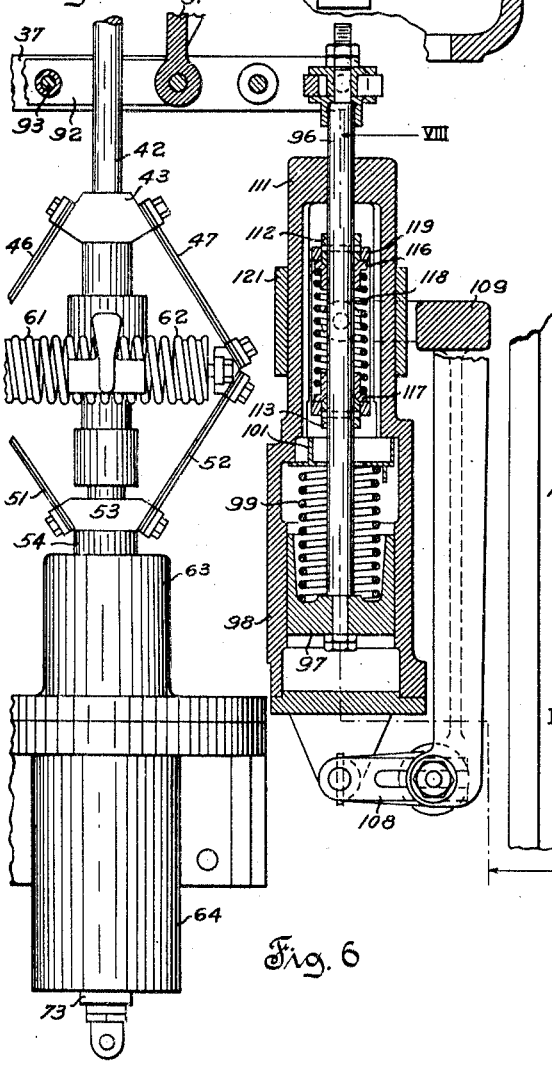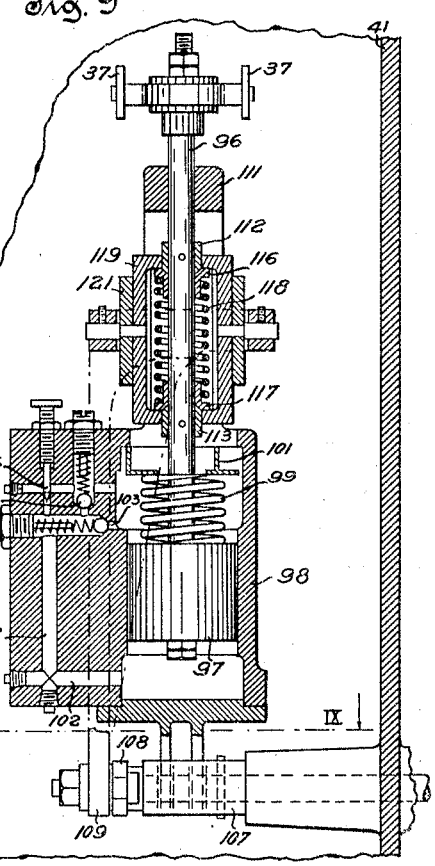

Patented Jan. 25, 1938

2,106,684

UNITED STATES PATENT OFFICE 2,106,684

GOVERNOR

Joseph J. Ring and Beverly R. Nichols, Wauwatosa, and Arnold Pfau, Milwaukee, Wis., assignors to Allis-Chalmers Manufacturing Company, Milwaukee, Wis., a corporation of Delaware Application August 31, 1935, Serial No. 38,724

17 Claims. (Cl. 121—42)

This invention relates to improvements in governing systems for prime mover driven electric current generating units and more particularly to units forming portions of systems normally subject to slow and slight speed changes and in which such changes must be avoided as much as possible.

Electric power systems and particularly the systems transmitting power for material distances are generally alternating current systems. Power from such alternating current systems is used for purposes which require that the frequency of the alternating current flowing in the systems be maintained within predetermined limits. Governing systems must therefore be very sensitive to respond to any changes in the operation of the generating unit which would affect the frequency and must act with such promptness as to keep such changes within the desired narrow limits. In addition to the continuous speed regulation required for frequency control, the governing system must, of course, also be capable of interrupting operation of the generating unit when certain types of emergency conditions arise. Due to the extensive interconnection of modern power systems, large flywheel effects are obtained in such systems so that momentary load fluctuations are a relatively small percentage of the total load on such systems. The governors employed in such interconnected systems must therefore be more sensitive than was previously the case to keep the speed and hence the frequency variations in the same ratio as was previously done in systems not having such high flywheel constant or effect. Such sensitivity of the governors employed must however be in the direction of readier response to slight speed variations and not in the direction of causing a more rapid change in the output of the prime mover after a tardy response, to avoid a too rapid change in the kinetic energy supplied to the prime mover. The small and generally gradual speed changes in large systems must be immediately recognized by the governor and a prompt change of the output of the unit must be effected at once to maintain system stability.

To secure such operation of the governor as will cause an immediate correction of the smallest and most gradual speed changes which may be practically corrected in the operation of a prime mover generating unit, it is necessary that such governor be highly sensitive, that the governor itself be relieved of all necessity for furnishing power for the control operation, that the restricted operating range of the speed responsive portion of the governor be increased, that all the moving masses of the governor be balanced as perfectly as possible, that all lost motion be eliminated and that the effect of inertia and of friction be minimized in the operation of the governor as far as possible. It is also necessary that means be provided by which the slightest action of the speed responsive means of the governor may be amplified and transmitted to the machine to be governed and that means also be provided which cause compensation or restoration of the fluid flow control means of the machine to be governed to the neutral position in a different manner depending on the rate of change of the speed of the prime mover.

It is therefore an object of the present invention to provide a governing system for prime mover generating units in which the governor will correct for small and slow speed changes in the unit as well as for large and sudden speed changes and for emergency conditions such as over-speed.

Another object of the invention is to provide a governing system for prime mover generating units in which the speed responsive portions of the governor are driven at high speed and the masses of such portions are kept at a minimum to provide for immediate response thereof to slow and slight speed changes.

Another object of the invention is to provide a governing system for prime mover generating units in which the speed responsive portions of the governor serve purely as indicating and control means and are not required to produce any appreciable forces necessary to secure operation of the means controlling the flow of operating fluid to the machine to be governed.

Another object of the invention is to provide a governing system for prime mover generating units in which it is necessary for the speed responsive portions of the governor to move within only a very limited range to secure all of the necessary controlling actions for the machine to be governed.

Another object of the invention is to provide a governing system for prime mover generating units in which the masses of the speed responsive portions of the governor are balanced and in which all friction and lost motion are reduced to a minimum to increase the sensitivity thereof.

Another object of the invention is to provide a governing system for prime mover generating units in which the governor is provided with means connecting the speed responsive portions thereof and the machine to be governed, by which means the motion of the speed responsive means may be amplified as desired thus allowing limitation of the range of movement of the speed responsive means itself.

Another object of the invention is to provide a governing system in which the governor is provided with a compensating or restoring dashpot so connected with other portions of the governor as to provide different compensating actions dependent on the rate of change of speed of the prime mover electric generating unit.

Objects and advantages other than those above set forth will be apparent from the following description when read in connection with the accompanying drawings in which;

Fig. 2 illustrates a portion of the governor construction with the flyball operated portions thereof shown in vertical section and with the compensating or restoring dashpots thereof shown in elevation.

Fig. 3 is an enlarged view looking down on the speed responsive means or flyball head to illustrate the arrangement and relation of the various springs and weights comprising such flyball head.

Fig. 4 is an enlarged partial elevation of the flyball head construction to illustrate the manner of supporting the weights thereof and the arrangement of the springs providing such support.

Fig. 5 is a horizontal cross-sectional view on an enlarged scale, taken on the plane V—V of Fig. 2, to illustrate the manner in which the flyball head is connected with the valve controlling the operation of the control servo-motor, both the valve and the servo-motor being shown in detail in Fig. 2.

Fig. 6 is a view similar to that shown in Fig. 2 but illustrating the flyball head and associated portions of the governor in elevation with a vertical sectional view of the compensating or restoring dashpot and illustrating the connection of various links and levers therewith.

Fig. 7 is a view looking down on the dashpot and particularly illustrating the connection of the several levers therewith and with each other.

Fig. 8 is a vertical sectional view taken on the plane VIII—VIII of Fig. 2 and illustrating the construction of the bypass formed as a portion of the dashpot.

Fig. 9 is a view taken on the plane IX—IX of Fig. 8 to illustrate the connection of the lower levers and crank of the governing system with the compensating dashpot thereof, and Fig. 10 is a view taken on the plane of line X—X of Fig. 2 to illustrate the grooved construction of the bushing which serves as a bearing for the sleeve actuated by the flyballs.

Figure 1:
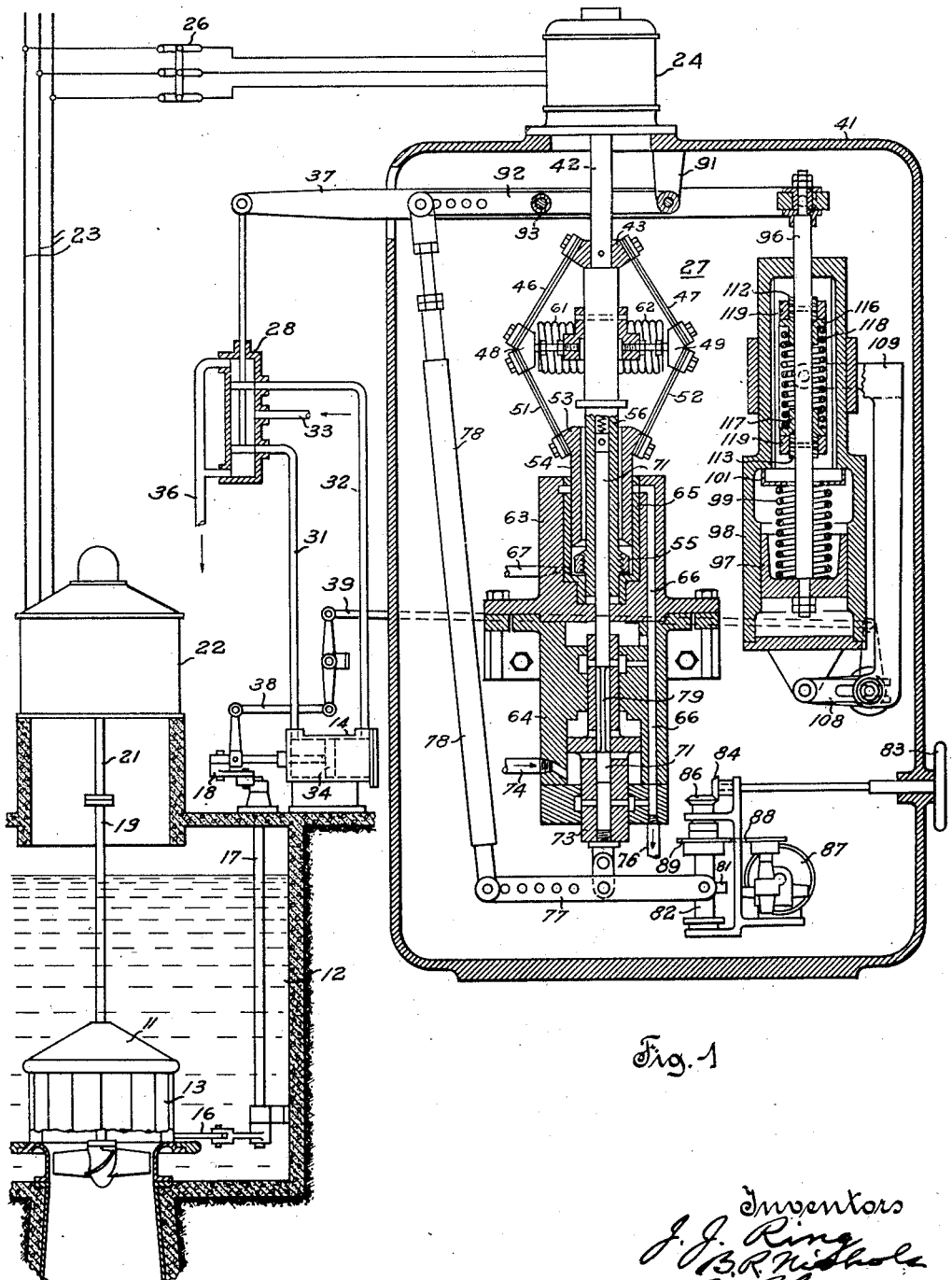
Fig. 1 is a diagrammatic illustration of a prime mover generating unit with a control or governing system embodying the invention applied thereto and in which the governing system is partially shown in enlarged sectional detail to facilitate explanation of the operation of the governing system.

Referring more particularly to the drawings by characters of reference, the reference numeral 11 designates a prime mover of any character and which is here shown as a hydraulic turbine of the propeller type set into an open flume structure 12. The flow of operating fluid to the prime mover is controlled by valve means suitable to the type of prime mover employed and to the operating fluid used and herein shown as being formed of a plurality of movable vanes forming a gate 13 which is connected to be operated by a fluid pressure operated main or power servo-motor 14 by way of a suitable linkage 16 connected with a shaft 17 and another suitable linkage 18.

It will be understood that any desired type of prime mover operated by fluid pressure suitable to such type and controlled by any type of gate or valve may be employed. The term "gate" is hence given a broad generic meaning and is intended to be substantially coextensive with control means other than those disclosed herein. The prime mover 11 is connected by way of its shaft 19 with the shaft 21 of an alternating current generator which is connected with and is disconnectible from a power line 23 by the usual switchgear means which are well known and therefore are not shown. The operation of gate 13 is controlled dependent on the electrical conditions of power line 23 to which is connected a motor 24 by means of a switch 26. The motor 24 is preferably of the high speed synchronous type and drives a governor generally designated at 27 and to be specifically described hereinafter, and which in turn actuates a main valve 28. The main control valve is connected with the ends of the main or gate operating servo-motor cylinder by conduits 31 and 32 to allow application of fluid pressure from a suitable source (not shown) through conduit 33, the valve 28 and conduits 31, 32 to the opposite sides of the piston 34 of the main servo-motor 14. Discharge of fluid from the servo-motor by way of the conduits 31, 32 and the conduit 36 is also controlled by the valve 28. Movement of the valve 28 is produced by movement of a floating lever 37 operated by the governor 27 and the movement of the servo-motor piston 34 reacts on the governor by connection thereof with a linkage 38 connected with the rod 39 leading to a portion of the governor structure which will be hereinafter specifically described.

The governor 27, generally considered, comprises a plurality of sub-combinations of structures including a flyball head driven by the motor 24 and operating a pilot valve to control application of fluid pressure to a control servo-motor; a dashpot with suitable by-passes; a synchronizing device which may be either manually operated at the governor or remotely operated as may be desired; a suitable leverage and linkage connecting the control servo-motor with the floating lever 37; a suitable linkage and leverage connecting the dashpot with the floating lever 37 to transmit the action of rod 39, as modified by the action of the dashpot, thereto; and a suitable connection between the dashpot and the rod 39. All of the governor sub-combinations recited above are enclosed within a casing or housing 41 which is suitably supported on or adjacent the prime mover generating unit and which in turn supports the motor 24 and provides fixed pivoting points and supports for other portions of the governor structure to be now specifically described.

As will be more clearly seen in Fig. 2, the spindle 42 of motor 24 has suitably secured thereto, a collar 43 to which are secured one end of each of a plurality of leaf springs arranged in groups 46 and 47, the springs of each group being spaced relative to each other to avoid friction between such springs and to allow the springs to flex freely without coming into contact with each other. Such spring groups are attached at diametrically opposite points on the collar 43. One end of each of the spring groups 46 and 47 is attached to weights 48 and 49 which are attached to one end of each of another plurality of leaf spring groups 51 and 52 attached at their opposite ends to another collar 53 which has a cylindrical portion 54 extending therefrom and is vertically movable over the hollow lower end 56 of the spindle 42. From a consideration of the drawings it will be seen that the masses of the weights 48 and 49 are as small as possible and that, in fact, such weights are of only sufficient size to provide for properly connecting the leaf spring groups thereto.

The position of weights 48 and 49 is initially determined by the position of stop screws 57 and 58, attached to a collar 59 mounted on the spindle 42 between collars 43 and 53, and by the tension of coil springs 61 and 62. Upward movement of the flyballs is limited by a collar 60 which is pinned to the motor spindle 42 between lower collar 53 and center collar 59, and downward movement of the flyballs is limited by a stop 55 adjustably mounted on spindle 42. The above structure constitutes what may be called a flyball head and forms the portion of the governor which is directly responsive to the speed of the motor 24 and hence responsive to an electrical condition of power line 23 in such manner that change of speed of the prime mover generating unit causes flexing of springs 46 and 47, 51 and 52, which raise and lower the collar 53 in direct ratio to such change of speed. Due to the elimination of pivots and other joints by the use of the leaf springs, all friction and loss of motion has been reduced to a minimum in the flyball head and, due to the high speed of operation of the motor 24, the masses of the weights may be kept very small.

The extension 54 of the lower flyball collar 53 and the spindle portion 56 extend in spaced relation into a casing mounted on the governor housing 41 and which is divided into an upper portion 63 and a lower portion 64. The two casing portions 63 and 64 are separable and are each formed with portions of a channel 66, the purpose of which will appear hereinafter. The collar extension 54 is guided within the upper casing portion 63 by a bushing 65 which is provided with grooves 131 to minimize the surface thereof in contact with the extension 54 and to provide for oil distribution to all portions of the contacting surfaces of the extension and the bushing and which serves as a steadying bearing for such extension. A pipe 67 connects the upper casing portion 63 with a source (not shown) of lubricating oil preferably under some slight pressure to provide proper lubrication for the parts rotating within the casing. The spindle portion 56 is slotted and a pin 68 extends through the slot and through the lower flyball collar 53 to provide an attachment for a pilot valve 71 under pressure of a spring 72 which eliminates lost motion in the movement of the valve by the flyballs. The valve is movable vertically within spindle portion 56 upon vertical movement of the flyball collar 53. The pin 68 is held in bushings 69 which are extensible into the spindle portion 56 to aid in centering the valve 71 within the hollow spindle portion and thus prevent contact therebetween and eliminate the possibility of friction therebetween. The position of the bushings 69 is controlled by set screws 70 and the bushings are closed by suitable means such as screw plugs 75 by which the position of the pin 68, which floats in the bushings, may be adjusted. The valve 71 has a reduced portion 79 intermediate its ends to provide a passage for fluid pressure and the edges of the full cross section portions of the valve adjacent the reduced portion thereof provide a sharp cutoff for the flow of such fluid pressure as will be explained hereinafter. Valve 71 extends into a hollow differential piston 73 with the upper piston surface thereof the larger of the two piston surfaces and which is movable only in a vertical direction within the lower casing portion 64 which forms a cylinder for such piston. Such piston and the casing portion thereabout form a servo-motor which is connected with and aids in controlling the movement of the floating lever as will be described. The control servo-motor piston 73 is provided with apertures by which fluid under pressure, and preferably oil under a constant pressure, may flow from a suitable source (not shown) by way of a supply line 74 into the spaces about the piston 73 and into the channel 66 and may discharge therefrom by way of a line 76. The flow of oil through the passages above indicated and the action of such pressure on the surfaces of the piston 73 is controlled by valve 71 as will be described hereinafter.

It will be understood from the above description of the flyball head and of the pilot valve structure, that the pilot valve 71 rotates with the spindle 42 and that the control servo-motor piston 73 does not rotate and is movable only in a vertical direction. Any vertical movement of the pilot valve therefore causes each point thereof to move in a spiral path relative to the path of movement of the servo-motor piston. The major component in the movement of the pilot is rotary and is supplied by the driving motor 24. The small vertical component only need therefore be furnished by the energy of the flyballs which minimizes the duty imposed on such flyballs and increases the sensitivity thereof.

Movement of the flyballs and of the extension 54 from the collar 53 moved by said flyballs is limited by the spacing of the end of the extension from the fixed collar 60 and from the collar 55 forming an adjustable seat therefore in the upper casing portion 63. It will thus be seen that the range of movement of the flyballs and the stroke of the pilot valve 71 may be adjusted as desired.

The control servo-motor piston 73 is connected with a lever 77 which is provided with a plurality of holes for varying the connection therewith of a rod 78 which is connected with the floating lever 37 by way of another lever as will be explained. Variation of the connection of lever 77 and rod 78 permits a first multiplication of the movement of the control servo-motor piston 73 to provide a governor action upon the slightest movement of the flyball head. One end of the lever 77 is connected to a swivel nut 81 engaging a screw 82 mounted on the governing housing 41 and rotated by a hand-wheel 83 through bevel gears 84 and 86 or rotatable by a motor 87 through a chain 88 engaging a sprocket wheel 89 likewise mounted on the screw 82. The motor 87 can, of course, be operated from any point and thus forms a remote control for the movements of lever 77. The hand-wheel 83 and the motor 87 provide means for varying the operation, as desired, of the governor on the main control valve 28 and hence on the power servo-motor 14 to vary operation of the gate 13 thus permitting the speed of the prime mover generating unit to be varied to allow for synchronous connection of the unit with the power line 23 when such line is also supplied with alternating current from other generating units or to allow for variation in the output of the unit after such unit is connected to the line in parallel with other units. The structure of the synchronizing combination above described and its operation being already disclosed in U. S. Letters Patent No. 1,684,884, issued September 18, 1928, to Arnold Pfau, such structure has not been described in as great detail as the other portions of the governing system.

An extension 91 from the governor housing 41 provides a fixed fulcrum for a second auxiliary lever 92 which is pivotally connected at 93 with the floating lever 37 and is also provided with a plurality of holes at one end thereof to allow for variable connection of the rod 78 therewith. The second auxiliary lever 92 and the floating lever 37 are each provided with a plurality of holes intermediate their ends to allow for selective location of their pivotal connection 93. A second stroke multiplication is thus attained which is additive with the first multiplication. The one end of lever 37 is pivotally connected with the rod 96 of a piston 97 operating within a cylinder 98. The piston 97 is pressed toward one end of the cylinder 98 by a spring 99 held between piston 97 and a spring support 101 placed within the cylinder. Such action of the spring 99 merely compensates for the weight of the floating lever 37 and all portions connected therewith and thus eliminates initial bias on the dashpot. The cylinder is filled with a suitable fluid such as oil which may flow from one side of the piston 97 to the other side thereof through channel 102 shown in Fig. 8. The rate of flow of fluid from one side to the other side of the piston 97 may be partially controlled by adjustment of a needle valve 106 which allows slow movement of the piston 97 in either direction within the cylinder 98 without requiring movement of the cylinder 98 itself. Rapid movement of the piston 97 is however limited by the rate of flow of oil and such rate of flow can be varied only by opening of the ball valves 103 and 104. The dashpot cylinder 98 is pivotally connected with a sort of bell crank 107 mounted in the governor housing 41 and connected exteriorly of such housing with the relay rod 39. The crank 107 is provided with an extra arm 108 which is slotted to allow an adjustable pivotal connection thereof with a forked bell crank 109.

The crank 109 is connected with the dashpot piston rod 96 by a resilient means which is located within a yoke 111 through which the piston rod passes and which is preferably formed integral with the dashpot cylinder and extends upwardly therefrom. A collar 112 is connected with the piston rod near the top of the yoke 111 and a second collar 113 is connected with the piston rod near the top of the dashpot cylinder 98. Another pair of collars 116 and 117 are movably arranged on the piston rod between the fixed collars 112 and 113 and are normally held in engagement with such fixed collars by the action of a spring 118 retained within a spring cover 119 and engaging on flanges formed on the collars 116 and 117. The spring cover 119 also engages on such flanges of collars 116 and 117. Spring 118 may thus be compressed by movement of the spring cover 119 in either direction against the action of the spring pressing on the collars 116 and 117. One of such collars will be moved away from its seat on the adjustable fixed collar depending on the direction of movement of the spring cover. The spring cover 119 and the piston rod 96 are guided within the yoke 111 by a ring 121 about the yoke and enclosing the spring cover. The ring and the spring cover are joined by pins extending therethrough and forming pivotal points for connection of the forked end of the crank 109.

The principles involved and the manner of operation of the invention disclosed herein can be best understood by consideration of the operation of the several elements of the system and of the governor construction herein disclosed. To secure a complete comprehension of the invention, it is necessary to consider operation of the system from the normal speed condition shown when gradual and slow speed changes take place, when large and sudden speed changes take place, when the system is brought to standstill from normal speed operation and when the system is to be started from standstill. Each of the above conditions will therefore be considered in sufficient detail to render the operation of the system comprehensible.

As shown in the several drawings, it is assumed that the prime mover generating unit is in operation at the normal speed and is therefore delivering current to the power line 23 at the desired frequency. Gate 13 is then open and is retained in its open position by the servo-motor 14 in which the pressures are balanced on both sides of the piston 34. The main control valve 28 is in its neutral position to retain the piston 34 in the dead beat position. The flyballs are in the mid position, the control valve 71 shuts off flow of oil to the upper surface of the servo-motor piston 73 and lever 77, rod 78 and lever 37 remain in the position shown. There being no movement of the main servo-motor 34, the rod 39, crank 107 and crank 109 remain motionless and the dashpot cylinder and piston remain in the mid position shown. When gradual and small speed decreases take place, the speed of the motor 24 decreases accordingly and the flyball head contracts. The rotating pilot valve 71 is thus depressed relative to the servo-motor piston 73 and oil under pressure flows through supply pipe 74 and through the piston 73 to the larger upper surface thereof to produce a downward force on the piston 73. Such force is dependent only on the oil pressure and is much greater than any force which could possibly be derived from the flyballs. Thus a practically constant force due to the constant pressure of the externally supplied oil, is exerted on lever 77 even at the slightest change of speed of the unit which causes vertical movement of the pilot valve 71. The control servo-motor piston 73 depresses lever 77 and, through rod 78, also depresses floating lever 37. The main control valve 28 is then depressed to allow flow of fluid under pressure to the left hand side of the main servo-motor piston 34 which causes gate 13 to open farther. Such movement of the piston 34 moves the rod 39 to rock the crank 107 in a counterclockwise direction which pulls the dashpot cylinder 98 down. If such downward pull is slowly exerted, oil beneath the dashpot piston 97 flows through the by-pass 102 and needle valve 106 and the oil pressure on the two sides of the dashpot piston remains substantially balanced. But counterclockwise movement of the crank 107 also causes counterclockwise movement of the crank 109 about its fixed pivot which pulls down on the spring cover 119 an amount dependent on the position of the pivot in the slot in the lever 109. The speed decrease being gradual and the downward movement of spring cover 119 being less in magnitude than the downward movement of the dashpot cylinder, the dashpot piston 71 is moved down by an amount only dependent on the distance from the fixed pivot of the crank 109 to the connection thereof with the dashpot cylinder 98. Such relative movement between the dashpot and cylinder is however without effect on the regulating action, the only effective movement being that of the piston rod 96 which shifts levers 92 and 37 to compensate for the previous movement of the speed responsive portions of the governor and thus to return the main control valve 28 to its neutral position. The main servo-motor then remains in the position then attained until the prime mover generating unit speed begins to return to the normal value therefore or until another speed change takes place.

When the prime mover has been operating at normal speed, any further gradual decrease in the speed merely initiates another sequence of actions similar to that above described. Gradual increases in the speed to values above the normal, produce a sequence of actions which are merely severally the opposite of those above described and therefore require no separate detailed explanation.

Again assuming that the system has been operating at normal speed and that the several portions thereof are therefore in the positions shown in the drawings, when a sudden speed change such as a sudden and substantial decrease takes place, the speed of the motor 24 decreases quickly and the flyballs contract extensively. Pilot valve 71 is then depressed a material distance and oil flows to the upper larger surface of the control servo-motor piston 97 at its maximum rate. Lever 77 is thus depressed by a large amount and at a maximum rate to pull down on the lever 78 and the floating lever 37 to depress the main control valve 28 as far as is possible. Fluid pressure is thus rapidly admitted to the left-hand face of the main servo-motor piston 34 to open the gates 13 quickly. Such a quick movement of the piston 34 rapidly moves rod 39 toward the left to rock the crank 107 in a counter-clockwise direction which rapidly pulls down on the dashpot cylinder 98 to create a partial vacuum under the dashpot piston 97. Ball valve 103 then opens to allow oil to flow from above the piston 97 to the under side thereof, thus partially relieving the vacuum under piston 97 which would otherwise tend to pull rod 96 downward quickly. The actions immediately above have the ultimate result that only the small relaying stroke of the second compensation produced by crank 109 has any effect on the restoring action exerted on main control valve 28. Such rapid counter-clockwise movement of the crank 107 also causes crank 109 to press down quickly on the spring cover 119 which compresses spring 118 and moves collar 116 down. A force is thus exerted on the piston 97 which aids the partial vacuum below the piston in moving the piston down within cylinder 98 and relative thereto and thus causes the piston rod 96 to move downwardly quickly to rock lever 92 and to act on lever 37 to return valve 28 to the neutral position thereof. Further sudden decrease in speed of the unit produces a rapid repetition of the above sequence of actions to cause further opening of the gate 13. Sudden speed increases on the other hand result in the same sequence of actions above described but each of the actions is reversed as will be readily understood by those skilled in the art. Check valve 103 then remains closed and check valve 104 opens.

When the prime mover generating unit is to be brought to rest from the normal speed operation thereof, assuming that the unit is no longer under load, hand-wheel 83 is rotated to turn screw 82 in such direction as to move the swivel nut 81 down. Such movement of the nut 81 rocks the lever 77 around its pivotal connection with the control servo-motor piston 73 to lift the rod 78 and the floating lever 37 which lifts the main control valve 28. Such lifting of the valve 28 admits fluid under pressure on the right-hand face of the main servo-motor piston 34 which then moves the gate 13 in the closing direction. Even if the unit should speed up slightly when the load is entirely taken off, such action will be without substantial effect and screw-down of the nut 81 need merely be repeated or continued until the gates 13 are fully closed.

When the unit is to be put into operation from standstill, manipulation of the wheel 83 is reversed from that above described, preferably intermittently, until the prime mover generating unit is at the synchronous speed at which it may be connected with line 23.

It will thus be seen that the motor and the flyball head provide means directly and proportionally responsive to the speed variations of the prime mover generating unit. The motor being of the high speed type and the flyballs being constructed with the smallest mass possible, elimination of all joints by the use of springs reduces friction and lost motion to a minimum and makes the speed responsive portions of the governor as sensitive as possible to both slow and sudden changes in the speed of the unit. The pilot valve being continuously rotated by the governing driving motor, movement of the flyballs moves such pilot valve in a spiral path. Due to the continuous rotation of the pilot valve, the rotary component of the forces acting on the valve overcomes all inertia and friction and leaves only a very small vertical component to be supplied by the speed responsive means. The connection of the control valve and the flyballs is such as to practically eliminate all lost motion and all friction between the pilot valve and the portions of the governor including such valve. The control servo-motor is supplied with fluid from a source under constant pressure of as high value as may be desired and the control impulses are therefore constant and not dependent on the rate of change of speed of the unit. No control energy being abstracted from the flyballs by the servo-motor, the energy of the flyballs is not affected in any way by the controlling action itself. The several leverages provide a plurality of means for amplifying and multiplying the action of the control servo-motor thus allowing the control servo-motor stroke to be kept as small as may be desired. The dashpot is completely balanced and is without initial bias and is so connected that movement of the main control valve is differently compensated dependent on the amount and the rate of change of the unit speed. The dashpot and its connections are also so designed as to minimize friction and binding during operation thereof.

It will be obvious that the governor as a whole or the several elements thereof may be applied to any prime mover driven by any fluid. Such prime mover may be employed to drive any energy translating device and the flyballs may be driven mechanically from any speed responsive portion of the prime mover.

Although but one embodiment of the present invention has been illustrated and described, it will be apparent to those skilled in the art, that various changes and modifications may be made therein without departing from the spirit of the invention or from the scope of the appended claims.

We claim:

1. In a speed governor of the centrifugally actuated type, a spindle driven by a machine to be governed, means driven by said spindle and longitudinally movable directly proportional to the speed thereof and to the centrifugal force acting thereon, a servo-motor, means driven by said spindle and operable by longitudinal movement of the first said means to control operation of said servo-motor, means for multiplying and for transmitting the action of said servo-motor to a machine to be governed, a rod connected with the machine to be governed, a dashpot connected with the machine and with said rod to compensate for sudden changes in operation of said speed responsive means, and a yielding connection connecting said dashpot with said rod to compensate at different rates both for slow and for sudden changes in the rate of speed of the machine.

2. In a governor for controlling a prime mover, a speed responsive device comprising a spindle driven by the prime mover to be controlled, a casing, said spindle extending into said casing, a plurality of springs arranged in spaced relation in groups, the groups of said springs being joined in pairs, one end of each of the pairs of said springs being fixedly mounted on said spindle, a cylindrical member connected with the other end of each of the pairs of said springs and extending into said casing in movable relation therewith, a piston mounted within the casing and cooperating therewith to form a servomotor, and a valve connected with said member for longitudinal movement thereby upon centrifugal movement of said springs.

3. In a governor for controlling a prime mover, a speed responsive device comprising a spindle driven by the prime mover to be controlled, a casing, said spindle extending into said casing, a plurality of springs arranged in spaced relation in groups, members of small mass severally connecting the groups of said springs in pairs, one end of each of the pairs of said springs being fixedly connected with said spindle, a cylindrical member connected with the other end of each of the pairs of said springs and extending into said casing in movable relation therewith, a piston mounted within the casing and cooperating therewith to form a servomotor, and a valve connected with said cylindrical member for longitudinal movement thereby upon centrifugal movement of said springs.

4. In a governor for controlling a prime mover, a speed responsive device comprising a spindle driven by the prime mover to be controlled, a casing, said spindle extending into said casing, a plurality of leaf springs arranged in parallel spaced relation in groups, members of small mass severally connecting the groups of said springs in pairs, one end of each of the pairs of said springs being fixedly mounted on and closely adjacent to said spindle, a cylindrical member connected with the other end of each of the pairs of said springs and extending into said casing in movable relation therewith, a piston mounted within the casing and cooperating therewith to form a servomotor, and a valve connected with said cylindrical member for longitudinal movement thereby upon centrifugal movement of said springs.

5. In a governor for controlling a prime mover, a speed responsive device comprising a spindle driven by the prime mover to be controlled, a casing, said spindle extending into said casing, a plurality of springs arranged in spaced relation in groups, the groups of said springs being joined in pairs, one end of each of the pairs of said springs being fixedly mounted on said spindle, a cylindrical member connected with the other end of each of the pairs of said springs and extending into said casing in movable relation therewith, a bushing arranged within said casing to form a bearing for said member, said bushing being grooved to minimize the surface thereof in contact with said member, a piston mounted within said casing and cooperating therewith to form a servomotor, and a valve connected with said member for longitudinal movement thereby upon centrifugal movement of said springs.

6. In a governor for controlling a prime mover, a speed responsive device comprising a spindle driven by the prime mover to be controlled, a casing, said spindle extending into said casing, a plurality of springs arranged in spaced relation in groups, the groups of said springs being joined in pairs, one end of each of the pairs of said springs being fixedly mounted on said spindle, a cylindrical member connected with the other end of each of the pairs of said springs and extending into said casing in movable relation therewith, a piston mounted within the casing and cooperating therewith to form a servomotor, a valve cooperating with said piston to control the movement thereof, and means movably connecting said valve with said spindle and with said member to secure the effect of positive connections therebetween.

7. In a governor for controlling a prime mover, a speed responsive device comprising a spindle driven by the prime mover to be controlled, a casing, said spindle extending into said casing, a plurality of springs arranged in spaced relation in groups, the groups of said springs being joined in pairs, one end of each of the pairs of said springs being fixedly mounted on said spindle, a cylindrical member connected with the other end of each of the pairs of said springs and extending into said casing in movable relation therewith, an adjustable stop within said casing to limit the movement of said member in one direction, a piston mounted within said casing and cooperating therewith to form a servomotor, and a valve connected with said member for longitudinal movement thereby upon centrifugal movement of said springs.

8. In a governor for controlling a prime mover, a speed responsive device comprising a spindle driven by the prime mover to be controlled, a casing, said spindle extending into said casing, a plurality of springs arranged in spaced relation in groups, members of small mass severally connecting the groups of said springs in pairs at a material distance from said spindle, one end of each of the pairs of said springs being fixedly mounted on and closely adjacent to said spindle, a cylindrical member connected with the other end of each of the pairs of said springs and extending into said casing in movable relation therewith, a piston mounted within the casing and cooperating therewith to form a servomotor, and a valve connected with said cylindrical member for longitudinal movement thereby upon centrifugal movement of said springs.

9. In a governor for controlling a prime mover, a speed responsive device comprising a spindle driven by the prime mover to be controlled, a casing, said spindle extending into said casing, a plurality of springs arranged in spaced relation in groups, members of small mass severally connecting the groups of said springs in pairs at a material distance from said spindle, one end of each of the pairs of said springs being fixedly mounted on and closely adjacent to said spindle, a cylindrical member connected with the other end of each of the pairs of said springs and extending into said casing in movable relation therewith, a bushing arranged within said casing to form a bearing for said cylindrical member, said bushing being grooved to minimize the surface thereof in contact with said member, a piston mounted within said casing and cooperating therewith to form a servomotor, and a valve connected with said cylindrical member for longitudinal movement thereby upon centrifugal movement of said springs.

10. In a governor for controlling a prime mover, a speed responsive device comprising a spindle driven by the prime mover to be controlled, a casing, said spindle extending into said casing, a plurality of springs arranged in spaced relation in groups, members of small mass severally connecting the groups of said springs in pairs, one end of each of the pairs of said springs being fixedly mounted on said spindle, a cylindrical member connected with the other end of each of the pairs of said springs and extending into said casing in movable relation therewith, a piston mounted within said casing and cooperating therewith to form a servomotor, a valve cooperating with said piston to control the movement thereof, and means movably connecting said valve with said spindle and with said cylindrical member to secure the effect of a positive connection therebetween.

11. In a governor for controlling a prime mover, a speed responsive device comprising a spindle driven by the prime mover to be controlled, a casing, said spindle extending into said casing and being hollow throughout the lower portion of its length, a plurality of springs arranged in spaced relation in groups, members of small mass severally connecting the groups of said springs in pairs at a material distance from said spindle, one end of each of the pairs of said springs being fixedly mounted on and closely adjacent said spindle, a cylindrical member connected with the other end of each of the pairs of said springs and extending into said casing in movable relation therewith, a bushing arranged within said casing to form a bearing for said cylindrical member, said bushing being grooved to minimize the surface thereof in contact with said member, a piston mounted within said casing and cooperating therewith to form a servomotor, a valve cooperating with said piston to control the movement thereof, and means movably connecting said valve with said spindle and with said cylindrical member to secure the effect of positive connection therebetween.

12. In a governor for actuating a floating lever controlling the operation of a prime mover control means, means directly and proportionally responsive to the speed variations of the prime mover, means controlled by said speed responsive means for providing the power required to actuate the floating lever, a dashpot connected with the floating lever, a rod relaying the movement of the prime mover control means to said dashpot, and a spring connection arranged between said dashpot and said rod, said dashpot and said spring connection returning the floating lever to the neutral position thereof at rates dependent on the rate of change of speed of the prime mover.

13. In a governor for actuating a floating lever controlling the operation of a prime mover control means, means directly and proportionally responsive to the speed variations of the prime mover, means controlled by said speed responsive means for providing the power required to actuate the floating lever, a dashpot connected with the floating lever, a rod relaying the movement of the prime mover control means to said dashpot, a plurality of collars fixed in spaced relation on the piston rod of said dashpot, a spring mounted between said collars, and a yoke connecting said relaying rod with said springs, said dashpot and said spring returning the floating lever to neutral position at rates dependent on the rate of change of speed of the prime mover.

14. A speed governor comprising a spindle responsive to speed variations, flyballs mounted on said spindle and movable outwardly therefrom upon changes of speed of rotation thereof, a sleeve arranged about said spindle and connected with said flyballs for rotation thereby and for movement longitudinally of said spindle upon outward movement of said flyballs, a pilot valve extending into said spindle, bushings extending through said sleeve for centering said valve within said spindle, a pin floating within said bushings and retaining said valve within said spindle, a spring compressed between said spindle and the end of said valve to retain said pin in a predetermined position within said bushings, and a servomotor controlled by movement of said pilot valve.

15. In a governor for actuating a floating lever controlling the operation of a prime mover control means, a flyball head directly and proportionally responsive to the speed variations of the prime mover, a pilot valve rotated by and longitudinally moved by said flyball head upon variations in the speed of the prime mover, a servomotor controlled by said pilot valve for providing the power required to actuate the floating lever, a system of adjustably interconnected levers connecting the floating lever with said servomotor for amplifying the movements of said servomotor, a dashpot connected with the floating lever, a rod relaying the movement of the prime mover control means to said dashpot, and a spring connection between said dashpot and said rod, said dashpot and said spring connection returning the floating lever to neutral position at rates dependent on the rate of change of speed of the prime mover.

16. In a governor for actuating a floating lever controlling the operation of a prime mover control means, means directly and proportionally responsive to the speed variations of the prime mover, means controlled by said speed responsive means for providing the power required to actuate the floating lever, means movably connecting said speed responsive means with said power producing means to provide the effect of a substantially positive connection therebetween, a system of variable levers connecting the floating lever with and amplifying the movements of said power producing means, a dashpot connected with the floating lever, a rod relaying the movement of the prime mover control means to said dashpot, and a yielding connection between said dashpot and said rod, said dashpot and said yielding connection returning the floating lever to neutral position at rates dependent on the rate of change of speed of the prime mover.

17. In a governor for actuating a floating lever controlling the operation of a prime mover control means, a spindle responsive to speed variations, flyballs mounted on said spindle and movable outwardly therefrom upon changes of speed of rotation thereof, a sleeve arranged about said spindle and connected with said flyballs for rotation thereby and for movement longitudinally of said spindle upon outward movement of said flyballs, a pilot valve extending into said spindle, a floating spring pressed connection between said spindle and said valve to provide a substantially positive connection therebetween, a servomotor controlled by said pilot valve for providing the power required to actuate the floating lever, a system of variable levers connecting the floating lever with and amplifying the movements of said servomotor, a dashpot connected with the floating lever, a rod relaying the movement of and connecting the prime mover control means to said dashpot, and a yielding connection between said dashpot and said rod, said dashpot and said yielding connection returning the floating lever to neutral position at rates dependent on the rate of change of speed of the prime mover.

JOSEPH J. RING.
BEVERLY R. NICHOLS.
ARNOLD PFAU.